United States Patent
Chen et al.

(10) Patent No.: US 12,445,500 B2
(45) Date of Patent: Oct. 14, 2025

(54) DYNAMIC TRUSTED EDGE GATEWAY FOR INDUSTRIAL TERMINALS BASED ON CLASSIFICATION AND HIERARCHICAL MANAGEMENT AND ITS IMPLEMENTATION METHOD

(71) Applicant: HANGZHOU DIANZI UNIVERSITY, Hangzhou (CN)

(72) Inventors: Yuanfang Chen, Hangzhou (CN); Jie Xiong, Hangzhou (CN); Jianxin Xu, Hangzhou (CN); Xing Fang, Hangzhou (CN); Xiaohan Chen, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 19/064,668

(22) Filed: Feb. 26, 2025

(65) Prior Publication Data

US 2025/0280041 A1 Sep. 4, 2025

(30) Foreign Application Priority Data

Feb. 29, 2024 (CN) .......................... 202410226276.5

(51) Int. Cl.
*H04L 9/40* (2022.01)
*G16Y 40/10* (2020.01)
*G16Y 40/50* (2020.01)

(52) U.S. Cl.
CPC .............. *H04L 63/20* (2013.01); *G16Y 40/10* (2020.01); *G16Y 40/50* (2020.01)

(58) Field of Classification Search
CPC ...................................................... H04L 63/20
(Continued)

(56) References Cited

U.S. PATENT DOCUMENTS

| 12,250,326 B2 * | 3/2025 | Sze ..................... H04L 63/0823 |
| 2006/0212930 A1 * | 9/2006 | Shull ..................... G06F 21/577 726/10 |

(Continued)

FOREIGN PATENT DOCUMENTS

| CN | 115426141 A | 12/2022 |
| CN | 115941236 A | 4/2023 |

(Continued)

OTHER PUBLICATIONS

Xiao Zheng et al., "Stochastic computation offloading and scheduling based on mobile edge computing", Access, vol. 7, May 30, 2019, pp. 72247-72256.

(Continued)

*Primary Examiner* — Anthony D Brown (57) ABSTRACT

A dynamic trusted edge gateway for industrial terminals based on classification and hierarchical management includes a information collection module, a local cache module, an identity collaboration module, a multi-point deployment support module, a security event log collaboration module, a trust evaluation result receiving module and a security policy execution module. The information collection module is configured to establish a connection with industrial terminals and collect a multi-dimension information of the industrial terminals and transmit the multi-dimension information to the local cache module and the trust evaluation result receiving module. The security event log collaboration module is configured to perform information exchange and event sharing with an industrial control security device and an industrial IoT security device, and transmit a security event information and a status data of the industrial control security device and industrial IoT security device to the trust evaluation result receiving module.

6 Claims, 2 Drawing Sheets

(58) Field of Classification Search
USPC .............................................................. 726/1
See application file for complete search history.

(56) References Cited

U.S. PATENT DOCUMENTS

2016/0212099 A1\* 7/2016 Zou ......................... H04L 63/08
2023/0208869 A1\* 6/2023 Bisht ........................ G06N 7/01
726/23

FOREIGN PATENT DOCUMENTS

WO 2015174968 A1 11/2015
WO 2023216641 A1 11/2023

OTHER PUBLICATIONS

Zengming Liu et al., "Design of Security Framework for Energy Interconnection Based on Zero Trust", Electric Power Information and Communication Technology, vol. 18, No. 3, Mar. 25, 2020, pp. 15-20.
Emiliano Sisinni et al., "Industrial Internet of Things: Challenges, Opportunities, and Directions", IEEE Transactions on Industrial Informatics, vol. 14, No. 11, Apr. 2018, pp. 1-11.
Yinhao Xiao et al., "Edge Computing Security: State of the Art and Challenges", Proceedings of the IEEE, vol. 107, No. 8, Aug. 2019, pp. 1608-1631.

\* cited by examiner

DYNAMIC TRUSTED EDGE GATEWAY FOR INDUSTRIAL TERMINALS BASED ON CLASSIFICATION AND HIERARCHICAL MANAGEMENT AND ITS IMPLEMENTATION METHOD

CROSS-REFERENCE TO RELATED APPLICATIONS

This application claims the benefit of priority from Chinese Patent Application No. 202410226276.5, filed on Feb. 29, 2024. The content of the aforementioned application, including any intervening amendments made thereto, is incorporated herein by reference in its entirety.

TECHNICAL FIELD

This application relates to edge security technology for industrial cloud platforms, and more particularly to a dynamic trusted edge gateway for industrial terminals based on classification and hierarchical management and its implementation method.

BACKGROUND

Edge security technology for industrial cloud platforms is one of the key technologies in the field of industrial internet, aiming to protect industrial cloud platforms from unauthorized edge device access and potential security threats. With the digital transformation of the industrial device and the widespread adoption of the industrial cloud platforms, edge computing and edge security have become urgent issues to address.

Traditional industrial internet security technologies mainly rely on static authorization mechanisms, where once a device is authorized, its permissions remain unchanged. However, with the rapid development of the industrial internet, this static authorization approach can no longer meet the complex and changing security requirements. Static authorization has the following issues.

1. Static authorization cannot adapt to the dynamic changes in the status of industrial devices. During operation, industrial device is affected by various internal and external factors, causing changes in its security status. Static authorization cannot dynamically adjust according to these changes.

2. Static authorization cannot deal with new security threats. As cyberattack methods continue to evolve, static authorization mechanisms are vulnerable to bypassing and attacks by malicious actors.

3. Static authorization makes it difficult to achieve fine-grained control over edge devices. In the industrial internet environment, different devices may require different levels of authorization, but static authorization cannot meet such fine-grained control needs.

It is evident that some existing research has addressed the security issues of the industrial internet, but most still focus on static authorization and lack real-time evaluation and authorization adjustment based on device dynamics. For example, Sisinni et al., in "Industrial Internet of Things: Challenges, Opportunities, and Directions", discuss the challenges and solutions in the industrial Internet of Things (IoT) security but do not explore dynamic authorization technologies in depth. Additionally, Yinhao Xiao et al., in "Edge Computing Security: State of the Art and Challenges", provides a detailed overview of the security challenges in edge computing but have yet to conduct an in-depth discussion on technical solutions for dynamic authorization.

SUMMARY

A purpose of the present application is to provide a dynamic trusted edge gateway for industrial terminals based on classification and hierarchical management and its implement method to address the security challenges faced by industrial cloud platforms and the issue that traditional static authorization methods cannot meet the needs of the rapidly developing industrial internet. By integrating static identity factors with dynamic information indicators, the technical solution provided herein enables flexible and dynamic trust authorization for industrial edge devices.

The technical solution provided herein is as follows.

A dynamic trusted edge gateway for industrial terminals based on classification and hierarchical management, comprising:
  an information collection module;
  a local cache module;
  an identity collaboration module;
  a multi-point deployment support module;
  a security event log collaboration module;
  a trust evaluation result receiving module; and
  a security policy execution module;
  wherein the information collection module is configured to establish a connection with the industrial terminals, collect a multi-dimension information of the industrial terminals, and transmit the multi-dimension information to the local cache module and the trust evaluation result receiving module; wherein the multi-dimension information comprises internet of things (IoT) connectivity status, embedded operating system version, application software version, software license validity period, hardware configuration information, hardware version, network address and communication protocol;
  the security event log collaboration module is configured to perform information exchange and event sharing with an industrial control security device and an industrial IoT security device to obtain an exchanged information, and transmit the exchanged information to the trust evaluation result receiving module, so as to evaluate a trust degree and a security degree of the industrial control security device and the industrial IoT security device;
  the identity collaboration module is configured to interact with a cloud control center to obtain a classification and hierarchical information of the industrial terminals and synchronously update the classification and hierarchical information to the trust evaluation result receiving module;
  the multi-point deployment support module is configured to interact with the cloud control center, and enable interaction and information synchronization in a case that a plurality of dynamic trusted edge gateways are deployed, so as to allow the plurality of dynamic trusted edge gateways to work collaboratively and maintain the multi-dimension information and a security policy;
  the local cache module is configured to receive the multi-dimension information collected by the information collection module, and store a predetermined classification and hierarchical information; wherein the predetermined classification and hierarchical information comprises security level, authorized access scope, and trust score of each of the industrial terminals;

the trust evaluation result receiving module is configured to report the trust score of each of the industrial terminals to the cloud control center, and receive an updated dynamic trust result from the cloud control center, so as to achieve dynamic authorization management of the industrial terminals; wherein the cloud control center is configured to determine whether a real-time trust score of each of the industrial terminals is within a security range, and update a trust credential and an access control level of each of the industrial terminals to obtain and transmit the updated dynamic trust result to the trust evaluation result receiving module; and the security policy execution module is configured to execute a security policy; wherein the security policy comprises access control, traffic monitoring and security event response of the industrial terminals, perform access authorization for the industrial terminals based on updated multi-dimension information and an authorization policy, monitor behavior and traffic of the industrial terminals, and respond to security events of the industrial terminals.

A method for implementing the dynamic trusted edge gateway, comprising:

(S1) performing classification and hierarchical management on the industrial terminals based on a preset classification and hierarchical template, wherein the preset classification and hierarchical template comprises static identity factor-based classification and security level-based hierarchical management;

(S2) actively establishing, by the information collection module, a connection with the industrial terminals; and collecting, by the information collection module, multi-dimension information of the industrial terminals;

(S3) obtaining, by the identity collaboration module, the classification and hierarchical information from the cloud control center and a trusted access to an application resource of an industrial cloud platform; performing, by the identity collaboration module, synchronous access authorization for the industrial terminals; establishing, by the identity collaboration module, a communication connection with the industrial cloud platform or a security proxy of the industrial cloud platform;

(S4) monitoring and obtaining, by the information collection module, a dynamic information of the industrial terminals in real time; performing, by the information collection module, comprehensive assignment on the dynamic information of the industrial terminals to obtain an initial comprehensive trust score; generating, by the trust evaluation result receiving module, a final comprehensive trust score of each of the industrial terminals based on the initial comprehensive trust score and a security event log from the industrial control security device and the industrial IoT security device; and uploading, by the identity collaboration module, the final comprehensive trust score to the cloud control center; and (S5) determining, by the cloud control center, whether the final comprehensive trust score of each of the industrial terminals is within the security range based on a trust score range, wherein the trust score range is determined by class and grade of each of the industrial terminals; updating, by the cloud control center, the trust credential and the access control level of each of the industrial terminals; and transmitting, by the cloud control center, the updated dynamic trust result to the identity collaboration module and the security policy execution module, so as to achieve dynamic edge trust control.

In an embodiment, the industrial terminals comprise an industrial control system, a production device, an industrial IoT sensor and an industrial access terminal.

In an embodiment, tin step (S1), a static identity factor comprises attribute and function of the industrial terminals, and cloud-enabled application type, access method and interactive data flow type of the industrial cloud platform; and five security levels are set, respectively unauthorized access, authenticated access, limited access, controlled access and managed access.

In an embodiment, in step (S2), the multi-dimension information comprises IoT connectivity status, embedded operating system version, application software version, software license validity period, hardware configuration information, hardware version, network address, network port, and communication protocol and version information.

In an embodiment, in step (S4), the dynamic information comprises network connection quality, session status of the industrial terminals, traffic type and volume, cloud application access type, interface calling frequency, status of published and subscribed message queues, data access type, and read or write frequency.

In an embodiment, the initial comprehensive trust score is obtained through steps of:

determining a significance of each of a plurality of dynamic indicators of usage status of the industrial terminals to a trust level of the industrial terminals based on a feature F, a historical behavior H and an impact range R of each of the plurality of dynamic indicators, expressed as:

$$I_i = f(F_i, H_i, R_i);$$

wherein $I_i$ represents a significance of an i-th dynamic indicator among the plurality of the dynamic indicators to the trust level of the industrial terminals; $F_i$ represents a feature of the i-th dynamic indicator; $H_i$ represents a historical behavior of the i-th dynamic indicator; and $R_i$ represents an impact range of the i-th dynamic indicator;

assigning each of the plurality of dynamic indicators a weight W;

scoring each of the plurality of dynamic indicators based on a trust score P of the plurality of dynamic indicators from the preset classification and hierarchical template, the significance I of each of dynamic indicators and the weight W of each of the plurality of dynamic indicators, expressed as:

$$S_i = P_i \times I_i \times W_i;$$

wherein $S_i$ represents a score of the i-th dynamic indicator; $P_i$ represents a trust score of the i-th dynamic indicator; and $W_i$ represents a weight of the i-th dynamic indicator; and subjecting scores of the plurality of dynamic indicators to weighted summing to obtain the initial comprehensive trust score T of the industrial terminals, expressed as:

$$T = \sum_{i=0}^{n} S_i;$$

wherein T represents the initial comprehensive trust score of the industrial terminals; and n represents the number of the plurality of dynamic indicators.

The technical solution provided herein has the following benefits.

The implementation of the dynamic trusted edge gateway proposed in this application offer multiple advantages and positive effects, playing a crucial role in ensuring the security and stable operation of the industrial cloud platforms. Firstly, this technology enables flexible and dynamic trust management for industrial edge devices. By integrating static identity factors with dynamic indicators, the system dynamically adjust authorization based on the real-time status of devices. This allows industrial cloud platforms to better adapt to the complex and changing industrial internet environment. Such flexibility and intelligence enhance the platform's ability to manage edge device security effectively. Secondly, the implementation of the dynamic trusted edge gateway effectively address emerging security threats. Traditional static authorization methods are vulnerable to bypassing and attacks by malicious actors. In contrast, this technology provided herein evaluates device trust scores in real time, allowing for timely detection and response to security threats, thereby improving the overall security of the industrial internet system. Additionally, this technology provided herein enables fine-grained control over edge devices. Different devices may require different levels of authorization, and the edge dynamic trusted authorization technology can dynamically adjust authorization levels based on device status. This ensures precise device management, contributing to enhanced security and flexibility across the system. Most importantly, this technology provided herein provides a comprehensive security management solution for industrial cloud platforms. By implementing the dynamic trusted edge gateway, industrial cloud platforms can achieve intelligent and dynamic authorization management for edge devices, thereby enhancing overall system security and stability. This technology provides critical support for the development and secure operation of the industrial internet.

In conclusion, the implementation of the dynamic trusted edge gateway bring new technological breakthroughs and solutions to the field of edge security for industrial cloud platforms, offering significant application potential and societal benefits. Its widespread adoption is expected to greatly enhance the security and stability of industrial internet systems, contributing to the sustainable and secure development of the industrial internet.

DETAILED DESCRIPTION OF EMBODIMENTS

The present disclosure will be further described below in conjunction with the accompanying drawings. The following embodiments are merely used to illustrate the technical solution of the present disclosure more clearly, and cannot be used to limit the protection scope of the present disclosure.

Figure 1:
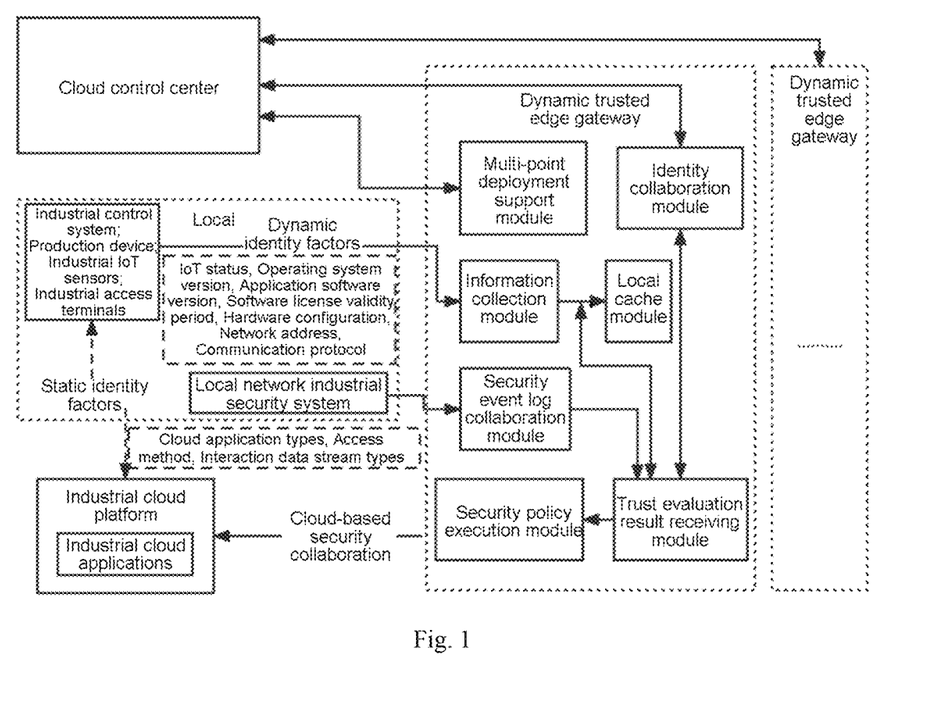
FIG. 1 schematically shows the structure of the dynamic trusted edge gateway system according to an embodiment of the present disclosure.

As shown in FIG. 1, the dynamic trusted edge gateway for industrial terminals based on classification and hierarchical management includes an information collection module, a local cache module, an identity collaboration module, a multi-point deployment support module, a security event log collaboration module, a trust evaluation result receiving module and a security policy execution module.

The information collection module is configured to establish a connection with the industrial terminals, collect a multi-dimension information of the industrial terminals, and transmit the multi-dimension information to the local cache module and the trust evaluation result receiving module. The multi-dimension information includes internet of things (IoT) connectivity status, embedded operating system version, application software version, software license validity period, hardware configuration information, hardware version, network address and communication protocol.

The security event log collaboration module is configured to perform information exchange and event sharing with an industrial control security device and an industrial IoT security device to obtain an exchanged information, and transmit the exchanged information to the trust evaluation result receiving module, so as to evaluate a trust degree and a security degree of the industrial control security device and the industrial IoT security device.

The identity collaboration module is configured to interact with a cloud control center to obtain a classification and hierarchical information of the industrial terminals and synchronously update the classification and hierarchical information to the trust evaluation result receiving module.

The multi-point deployment support module is configured to interact with the cloud control center, and enable interaction and information synchronization in a case that a plurality of dynamic trusted edge gateways are deployed, so as to allow the plurality of dynamic trusted edge gateways to work collaboratively and maintain the multi-dimension information and a security policy.

The local cache module is configured to receive the multi-dimension information collected by the information collection module, and store a predetermined classification and hierarchical information. The predetermined classification and hierarchical information includes security level, authorized access scope, and trust score of each of the industrial terminals.

The trust evaluation result receiving module is configured to report the trust score of each of the industrial terminals to the cloud control center, and receive an updated dynamic trust result from the cloud control center, so as to achieve dynamic authorization management of the industrial terminals. The cloud control center is configured to determine whether a real-time trust score of each of the industrial terminals is within a security range, and update a trust credential and an access control level of each of the industrial terminals to obtain and transmit the updated dynamic trust result to the trust evaluation result receiving module.

The security policy execution module is configured to execute a security policy. The security policy includes access control, traffic monitoring and security event response of the industrial terminals, perform access authorization for the industrial terminals based on updated multi-dimension information and an authorization policy, monitor behavior and traffic of the industrial terminals, and respond to security events of the industrial terminals.

Figure 2:
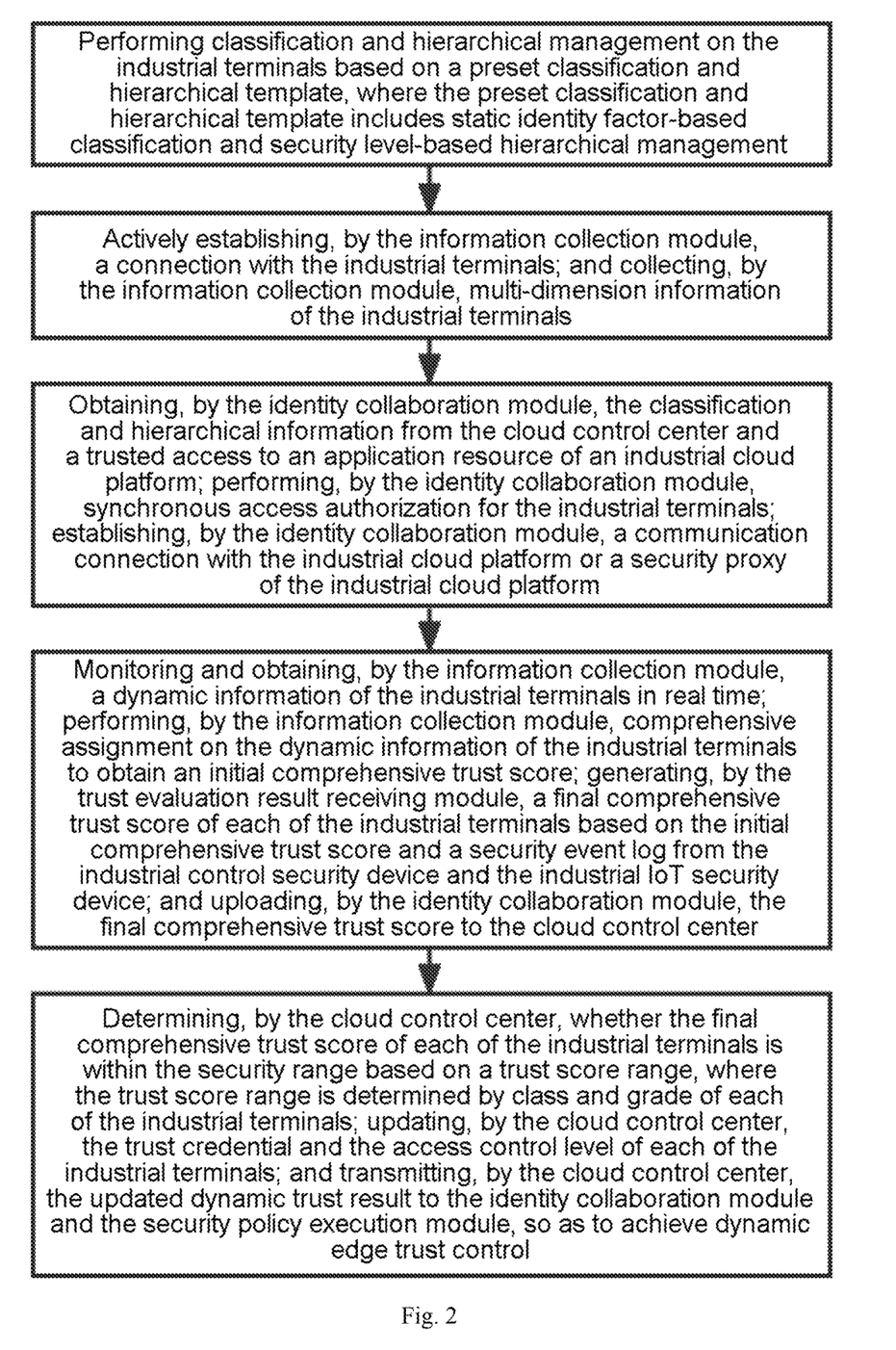
FIG. 2 is a schematic flowchart of the method for implementing the dynamic trusted edge gateway according to an embodiment of the present disclosure.

As shown in FIG. 2, the method for implementing the dynamic trusted edge gateway includes the following steps.

(S1) Classification and hierarchical management is performed on the industrial terminals based on a preset classification and hierarchical template. The preset classification and hierarchical template includes static identity factor-based classification and security level-based hierarchical management.

Specifically, in the preset classification and hierarchical template, static identity factors of industrial terminals are described as follows. Hierarchical and classification management of industrial terminals are performed based on static identity factors, which consider the characteristics and functions of the industrial terminals in combination with cloud-enabled application type, access method and interactive data flow type of the industrial cloud platform. In this embodiment, industrial control systems, production devices, industrial IoT sensors, and industrial access terminals, which have different functions and access requirements, are classified according to their characteristics.

Furthermore, security level hierarchical in the preset classification and hierarchical template is described as follows. A more detailed security level hierarchical scheme is defined to meet the specific needs of industrial terminals. The security levels are divided into five categories. (1) Unauthorized Access: refers to attempts to access the system or data without authorization or identity verification. (2) Authenticated Access: access after identity verification, but still subject to restrictions. (3) Limited Access: Limited access to system or data, usually restricted to specific functions or data ranges. (4) Controlled Access: a higher level of access to data or system, including broader permissions to system functions and data. (5) Administrative Access: the highest level of access to data or system, typically including the ability to configure, manage, and monitor the system.

Furthermore, the static identity factor template is described as follows. For each security level, the corresponding static identity factor template is detailed. These factors may include, but are not limited to, device type, device identity, access permissions, and data interaction types. These factors serve as the basis for evaluating the security level of the industrial terminals.

It should be noted that the evaluation of the industrial terminal's security level is a standard technical practice. In this embodiment, each specific "factor" of the static identity factors listed (such as device type, device identity, access permissions, and data interaction type) is assigned a score according to its value, from low to high (e.g., score values from 1 to 10), and each factor is also assigned a weight (also from 1 to 10). The total evaluation score is calculated by multiplying each factor's score with its corresponding weight and summing the results. This approach is relatively simple. For instance, for the "device type" factor, the weight could be 5, and device types like PLCs, sensors, and CNC machines could be assigned scores such as 5, 3, and 5, respectively. Lower scores indicate lower levels, and higher scores indicate higher levels. The weight values in the total level of the factors mentioned above are also low for low-level weights, and high for high-level weights. In this way, for the final evaluation of the static identity factors of each actual industrial terminal (the score of each factor multiplied by the weight value, and then the sum of all these products is the final evaluation score), the higher the final evaluation score, the higher the level. Then, according to the various intervals of the overall score, they can be divided into the five security levels mentioned above.

Predefined dynamic identity identification and maintenance is described as follows. For each security level, dynamic identity identification and maintenance rules are implemented to ensure that identity identification and access control can be dynamically performed according to real-time situations during the actual access process.

In this embodiment, according to the level determined by the static factors above, the dynamic factors described are also accumulated by factor scoring and weight product in the same way. The difference here is that the dynamic factors can be assigned negative points, which may reduce the original level evaluation points, so there is a possibility of level reduction, which is mainly the role of dynamic discrimination, that is, if the score is reduced, the access rights of industrial terminals will be reduced accordingly.

Storage of industrial terminal classification and hierarchical library is described as follows. The industrial terminal classification and hierarchical library is formed and stored in the industrial cloud, including a third-party cloud service provider that provides industrial terminal identity services, and a private industrial terminal identity control platform deployed simultaneously with the industrial cloud platform.

This method ensures that the classification and hierarchical information of industrial terminals can be centrally managed and maintained in the cloud, and can be linked by the dynamic trusted edge gateway and the cloud identity control center, and store local cache to support real-time access control and identity discrimination.

(S2) The information collection module actively establishes a connection with the industrial terminals, and the information collection module collects multi-dimension information of the industrial terminals.

In this embodiment, the dynamic trusted edge gateway is deployed near the side of the industrial terminals. It actively establishes connections with industrial terminals and collects multidimensional terminal multi-dimension information, including but not limited to the IoT connectivity status, embedded operating system version, application software version, software license validity period, hardware configuration information, hardware version, network address, network port and communication protocol and version information.

Specifically, the deployment location of the dynamic trusted edge gateway is provided close to the industrial terminal side. This configuration ensures the immediate collection and processing of the multi-dimension information.

Furthermore, the dynamic trusted edge gateway actively establishes connections with industrial terminals and collects multidimensional terminal multi-dimension information. This collected data encompasses the IoT connectivity status, embedded operating system version, application software version, software license validity period, hardware configuration information, hardware version, network address, network port and communication protocol and version information, thereby providing a comprehensive view of the state and characteristics of the industrial terminals.

Furthermore, according to the configured industrial cloud applications to be accessed and the terminal type, the dynamic trusted edge gateway retrieves security classification and hierarchical information from the local cache. This ensures that devices with known types can obtain directly their security classification and hierarchical information from the local cache, facilitating subsequent access control and identity verification.

For devices with unknown types, if such a device is encountered, the dynamic trusted edge gateway immediately generates identity credentials and uploads them to the cloud control center while simultaneously obtaining the industrial device's classification and hierarchical information. This ensures that even for devices with unknown types, the classification and hierarchical information can be acquired from the cloud control center for subsequent access control and identity authentication.

If the cloud control center does not already possess the classification and hierarchical information for that device type, the device will reclassified through the cloud control center and synchronize the information to the dynamic trusted edge gateway. This guarantees that devices with new types can be classified and graded in the cloud, and the information is synchronously delivered to the dynamic trusted edge gateway, thereby ensuring the security and consistency of the entire system.

In scenarios where there are multiple deployments of dynamic trusted edge gateways, any new device classification and hierarchical information will be synchronously disseminated to all deployed dynamic trusted edge gateways, ensuring the consistency and accuracy of the entire system.

(S3) The identity collaboration module obtains the classification and hierarchical information from the cloud control center and a trusted access to an application resource of an industrial cloud platform. The identity collaboration module performs synchronous access authorization for the industrial terminals, the identity collaboration module establishes a communication connection with the industrial cloud platform or a security proxy of the industrial cloud platform.

Specifically, the dynamic trusted edge gateway obtains the classification and hierarchical information of the industrial terminal identity from the cloud control center and acquires trusted access to the application resources of the industrial cloud platform. It then performs synchronized access authorization for the devices and establishes communication with the industrial cloud platform or its security proxy. Each dynamic trusted edge gateway supports connections and identity maintenance for multiple industrial terminals.

Further, in this embodiment, the classification and hierarchical information of the industrial terminal identity is obtained, and the dynamic trusted edge gateway retrieves such information from the cloud control center. This ensures that the dynamic trusted edge gateway possesses the most up-to-date information necessary for performing access control and identity authentication on industrial terminals.

It should be noted that obtaining trusted access to the application resources of the industrial cloud platform means the dynamic trusted edge gateway acquires trusted access to the resources of the industrial cloud platform. This ensures that devices are authorized when accessing cloud applications, thereby enhancing the overall security and controllability of the system.

Synchronized access authorization refers to the industrial terminals being granted access authorization in a synchronized manner, ensuring that identity authentication and authorization are performed promptly upon device access. This guarantees system security and compliance.

Establishing communication between the dynamic trusted edge gateway and the industrial cloud platform or its security proxy ensures secure communication and data transmission between the devices and the cloud, thus safeguarding the system's overall security and stability.

The dynamic trusted edge gateway supports multiple industrial terminals' connection and identity maintenance ensures the dynamic trusted edge gateway can handle the connection and identity management of multiple industrial terminals, enabling effective management and control in complex industrial environments with diverse device connectivity requirements.

(S4) The information collection module monitors and obtains a dynamic information of the industrial terminals in real time, the information collection module performs comprehensive assignment on the dynamic information of the industrial terminals to obtain an initial comprehensive trust score, the trust evaluation result receiving module generates a final comprehensive trust score of each of the industrial terminals based on the initial comprehensive trust score and a security event log from the industrial control security device and the industrial IoT security device, and the identity collaboration module uploads the final comprehensive trust score to the cloud control center.

It should be noted that the dynamic trusted edge gateway acquires and monitors dynamic information such as network connection quality, session status of the industrial terminals, traffic type and volume, cloud application access type, interface calling frequency, status of published and subscribed message queues, data access type, and read or write frequency in real time, and assigns a comprehensive value to the dynamic information of each industrial terminals according to the information indicator trust score in the preset classification and hierarchical template. At the same time, it can be linked with the security event logs of industrial control security devices and industrial IoT security devices to comprehensively evaluate the trust score of industrial terminals.

Specifically, the dynamic information is acquired and monitored in real time as follows. Network connection quality, industrial terminal session status, traffic type and size, cloud application access type and interface call frequency, publish and subscribe message queue status, data access type and read and write frequency and other dynamic information are acquired and monitored in real time by the information collection module to fully understand the operating status and behavioral characteristics of the industrial terminals and network.

The information indicator trust score in the preset classification and hierarchical template is set. The dynamic trusted edge gateway comprehensively assigns values to the dynamic information of each industrial terminal according to the information indicator trust score in the preset classification and hierarchical template through a weighted scoring method. First, for each dynamic indicator information, its importance to the trust of the industrial terminals is determined, and a corresponding weight is assigned to each indicator. Then, each dynamic indicator information is scored according to the information indicator trust score and weight in the preset classification and hierarchical template, and the weighted sum of each score is obtained to obtain the initial comprehensive trust score of the device. This method can make a more accurate and comprehensive evaluation of the trust of the industrial terminals based on the specific dynamic indicator information, and improve the control ability of the device security. This method ensures that the evaluation of the industrial terminals' behavior and status is based on the preset trust indicator, so as to make subsequent trust evaluation and control decisions.

Furthermore, the interaction of the security event log between the industrial control security device and the industrial IoT security device is described as follows. The dynamic trusted edge gateway is linked with the security event log of industrial control security device and industrial IoT security device to obtain information about security events and abnormal behaviors, so as to include this information in the scope of comprehensive evaluation, ensuring the comprehensiveness and accuracy of the device trust evaluation.

Finally, the trust score of the industrial terminals is comprehensively evaluated. The trust evaluation result receiving module comprehensively evaluates the trust score of the industrial terminal, combines dynamic information with preset trust indicators, and considers the information of security event logs to obtain the final comprehensive trust score for the comprehensive evaluation of the industrial terminals, which is uploaded to the cloud control center by the identity collaboration module.

(S5) The cloud control center determines whether the final comprehensive trust score of each of the industrial terminals is within the security range based on a trust score range. The trust score range is determined by class and grade of each of the industrial terminals. The cloud control center updates the trust credential and the access control level of each of the industrial terminals, and the cloud control center transmits the updated dynamic trust result to the identity collaboration module and the security policy execution module, so as to achieve dynamic edge trust control.

Specifically, the cloud control center determines the comprehensive trust scores of each industrial terminal based on the reports from the identity collaboration module.

It should be noted that in this embodiment, there are two conditions that trigger the reporting of trust scores: periodic reporting, where administrators can manually configure the validity period of the score; and real-time reporting, which occurs when there is a significant change in the score.

Furthermore, the cloud control center, in conjunction with the identity control center, evaluates whether the real-time trust scores of various types and levels of industrial terminals fall within their predefined security ranges. It then promptly updates the authorization credentials and access control levels. The results of the dynamic trust authorization are issued to the identity collaboration module and transmitted to the security policy execution module, thereby achieving edge-side dynamic trust control.

For critical production devices, the trust score range can be set between 90-100 points, ensuring strict security control and monitoring.

For general production devices, the trust score range can be 70-90 points, allowing relatively relaxed authorization management and monitoring.

For non-critical or test devices, the trust score range can be 50-70 points, maintaining basic security control and monitoring.

The comprehensive trust scores of industrial terminals reported by the dynamic trusted edge gateway can be triggered based on two conditions: periodic reporting, where administrators can manually configure the validity period of the score; and real-time reporting, which occurs when there is a significant change in the score.

The cloud control center, in conjunction with the identity control center, evaluates whether the real-time trust scores of industrial terminals fall within their corresponding trust score ranges based on their type and level. This ensures that trust evaluations are grounded in preset secure thresholds, allowing for timely detection and response to abnormal trust conditions.

Based on the evaluation of the real-time trust scores, the cloud control center promptly updates the authorization credentials and access control levels to ensure that device access rights and control levels align with their current trustworthiness. This enhances both the security and precision of access control.

The cloud control center sends the dynamic authorization results to the identity collaboration module and transmits them to the security policy execution module, enabling achieving dynamic trust control at the edge. This ensures that the dynamic trusted edge gateway can perform access control and authorization management based on the latest trust evaluation results, adapting to real-time changes in the security environment and device behavior.

From the description of the above embodiment, it can be understood that:

The dynamic trusted edge gateway is the core component of this system. It is deployed close to industrial terminals to enable local collection of multi-dimension information and implementation of authorization management. The dynamic trusted edge gateway connects with industrial terminals and actively collects multidimensional multi-dimension information, including IoT status, operating system version, application software version, software license validity, hardware configuration, network address, communication protocols, etc. This information forms a crucial basis for identifying the industrial terminals and evaluating their security status.

The dynamic trusted edge gateway features local caching capabilities, which are used to store predefined device classification and hierarchical information. This includes the device's security level, authorized access scope, and trust score, supporting dynamic trust control to support dynamic trust control. Local caching improves system responsiveness, reduces reliance on cloud resources, and enhances system stability and security.

The dynamic trusted edge gateway maintains close interaction with the cloud-based identity control center. Through communication with the cloud control center, the dynamic trusted edge gateway obtains classification and hierarchical information of industrial terminals and synchronizes this data to its local cache. This collaboration mechanism ensures the dynamic trusted edge gateway acquires up-to-date multi-dimension information and authorization policies, allowing the entire system to respond in a timely manner to changes in multi-dimension information and security events.

The dynamic trusted edge gateway also interacts with security event logs of industrial control security devices and industrial IoT security devices. By exchanging information and sharing events with these security devices, the dynamic trusted edge gateway gains more comprehensive insights into security events and device status data, thereby enabling more accurate evaluation of device trustworthiness and security. This collaboration mechanism improves the system's ability to perceive security events and monitor device status.

The dynamic trusted edge gateway reports the comprehensive trust scores of devices to the cloud control center, which determines whether the real-time trust scores of the devices fall within a security range. It then promptly updates authorization credentials and access control levels. The updated dynamic trust results are sent back to the dynamic trusted edge gateway, enabling dynamic authorization management of the devices. This dynamic trust mechanism ensures real-time monitoring and secure control over devices.

The dynamic trusted edge gateway is responsible for executing security policies, including access control, traffic monitoring, and security event response. Upon receiving the latest multi-dimension information and authorization policies, the dynamic trusted edge gateway authorizes device access, monitors device behavior and traffic, and responds promptly to security events. This policy enforcement capability is a crucial safeguard for device security within the system.

The dynamic trusted edge gateway supports interaction and information synchronization across multiple deployment points. When multiple dynamic trusted edge gateways are deployed simultaneously, they can work together to jointly maintain multi-dimension information and security policies, ensuring system consistency and security.

This embodiment integrates all elements of the modules of the dynamic trusted edge gateway system, from multi-dimension information collection to dynamic authorization management, to security event collaboration and local cache synchronization, constructing a comprehensive industrial internet security management system. In practical applications, security policies and authorization parameters can be adjusted according to specific industrial environments and device characteristics, achieving the best balance between security and efficiency.

Described above are merely preferred embodiments of this application, and are not intended to limit this application. It should be understood by those skilled in the art that any modifications, equivalent substitutions, and improvements made without departing from the spirit of this application shall fall in the scope of this application defined by the appended claims.

What is claimed is:

1. A method for implementing a dynamic trusted edge gateway for industrial terminals based on classification and hierarchical management, the dynamic trusted edge gateway comprising:
   an information collection module;
   a local cache module;
   an identity collaboration module;
   a multi-point deployment support module;
   a security event log collaboration module;
   a trust evaluation result receiving module; and
   a security policy execution module;
   the information collection module being configured to establish a connection with the industrial terminals, collect a multi-dimension information of the industrial terminals, and transmit the multi-dimension information to the local cache module and the trust evaluation result receiving module; and the multi-dimension information comprising internet of things (IoT) connectivity status, embedded operating system version, application software version, software license validity period, hardware configuration information, hardware version, network address and communication protocol;
   the security event log collaboration module being configured to perform information exchange and event sharing with an industrial control security device and an industrial IoT security device to obtain an exchanged information, and transmit the exchanged information to the trust evaluation result receiving module, so as to evaluate a trust degree and a security degree of the industrial control security device and the industrial IoT security device;
   the identity collaboration module being configured to interact with a cloud control center to obtain a classification and hierarchical information of the industrial terminals and synchronously update the classification and hierarchical information to the trust evaluation result receiving module;
   the multi-point deployment support module being configured to interact with the cloud control center, and enable interaction and information synchronization in a case that a plurality of dynamic trusted edge gateways are deployed, so as to allow the plurality of dynamic trusted edge gateways to work collaboratively and maintain the multi-dimension information and a security policy;
   the local cache module being configured to receive the multi-dimension information collected by the information collection module, and store a predetermined classification and hierarchical information; and the predetermined classification and hierarchical information comprising security level, authorized access scope, and trust score of each of the industrial terminals;
   the trust evaluation result receiving module being configured to report the trust score of each of the industrial terminals to the cloud control center, and receive an updated dynamic trust result from the cloud control center, so as to achieve dynamic authorization management of the industrial terminals; and the cloud control center being configured to determine whether a real-time trust score of each of the industrial terminals is within a security range, and update a trust credential and an access control level of each of the industrial terminals to obtain and transmit the updated dynamic trust result to the trust evaluation result receiving module; and
   the security policy execution module being configured to execute a security policy; and the security policy comprising access control, traffic monitoring and security event response of the industrial terminals, and being configured to perform access authorization for the industrial terminals based on updated multi-dimension information and an authorization policy, monitor behavior and traffic of the industrial terminals, and respond to security events of the industrial terminals; and
   the method comprising:
   (S1) performing classification and hierarchical management on the industrial terminals based on a preset classification and hierarchical template, wherein the preset classification and hierarchical template comprises static identity factor-based classification and security level-based hierarchical management;
   (S2) actively establishing, by the information collection module, a connection with the industrial terminals; and collecting, by the information collection module, multi-dimension information of the industrial terminals;
   (S3) obtaining, by the identity collaboration module, the classification and hierarchical information from the cloud control center and a trusted access to an application resource of an industrial cloud platform; performing, by the identity collaboration module, synchronous access authorization for the industrial terminals; establishing, by the identity collaboration module, a communication connection with the industrial cloud platform or a security proxy of the industrial cloud platform;
   (S4) monitoring and obtaining, by the information collection module, a dynamic information of the industrial terminals in real time; performing, by the information collection module, comprehensive assignment on the dynamic information of the industrial terminals to obtain an initial comprehensive trust score; generating, by the trust evaluation result receiving module, a final comprehensive trust score of each of the industrial terminals based on the initial comprehensive trust score and a security event log from the industrial control security device and the industrial IoT security device;

and uploading, by the identity collaboration module, the final comprehensive trust score to the cloud control center; and (S5) determining, by the cloud control center, whether the final comprehensive trust score of each of the industrial terminals is within the security range based on a trust score range, wherein the trust score range is determined by class and grade of each of the industrial terminals; updating, by the cloud control center, the trust credential and the access control level of each of the industrial terminals; and transmitting, by the cloud control center, the updated dynamic trust result to the identity collaboration module and the security policy execution module, so as to achieve dynamic edge trust control.

2. The method of claim 1, wherein the industrial terminals comprise an industrial control system, a production device, an industrial IoT sensor and an industrial access terminal.

3. The method of claim 1, wherein in step (S1), a static identity factor comprises attribute and function of the industrial terminals, and cloud-enabled application type, access method and interactive data flow type of the industrial cloud platform; and five security levels are set, respectively unauthorized access, authenticated access, limited access, controlled access and managed access.

4. The method of claim 1, wherein in step (S2), the multi-dimension information comprises IoT connectivity status, embedded operating system version, application software version, software license validity period, hardware configuration information, hardware version, network address, network port, and communication protocol and version information.

5. The method of claim 1, wherein in step (S4), the dynamic information comprises network connection quality, session status of the industrial terminals, traffic type and volume, cloud application access type, interface calling frequency, status of published and subscribed message queues, data access type, and read or write frequency.

6. The method of claim 1, wherein in step (S4), the initial comprehensive trust score is obtained through steps of:
determining a significance of each of a plurality of dynamic indicators of usage status of the industrial terminals to a trust level of the industrial terminals based on a feature F, a historical behavior H and an impact range R of each of the plurality of dynamic indicators, expressed as:

$$I_i = f(F_i, H_i, R_i);$$

wherein $I_i$ represents a significance of an i-th dynamic indicator among the plurality of dynamic indicators to the trust level of the industrial terminals; $F_i$ represents a feature of the i-th dynamic indicator; $H_i$ represents a historical behavior of the i-th dynamic indicator; and $R_i$ represents an impact range of the i-th dynamic indicator;

assigning each of the plurality of dynamic indicators a weight W;

scoring each of the plurality of dynamic indicators based on a trust score P of the plurality of dynamic indicators from the preset classification and hierarchical template, the significance I of each of dynamic indicators and the weight W of each of the plurality of dynamic indicators, expressed as:

$$S_i = P_i \times I_i \times W_i;$$

wherein $S_i$ represents a score of the i-th dynamic indicator; $P_i$ represents a trust score of the i-th dynamic indicator; and $W_i$ represents a weight of the i-th dynamic indicator; and subjecting scores of the plurality of dynamic indicators to weighted summing to obtain the initial comprehensive trust score T of the industrial terminals, expressed as:

$$T = \sum_{i=0}^{n} S_i;$$

wherein T represents the initial comprehensive trust score of the industrial terminals; and n represents the number of the plurality of dynamic indicators.

* * * * *